United States Patent [19]

Okada et al.

[11] 3,895,651
[45] July 22, 1975

[54] COMPOUND ASEPTIC VALVE

[75] Inventors: Katsuto Okada; Akichika Ishibashi; Hirotaka Watanabe, all of Tokyo, Japan

[73] Assignee: Morinaga Milk Industry Co., Ltd., Tokyo, Japan

[22] Filed: May 16, 1974

[21] Appl. No.: 470,618

[30] Foreign Application Priority Data
July 12, 1973  Japan................................ 48-83037

[52] U.S. Cl. ....... 137/630.22; 137/238; 137/614.11; 137/637.2; 251/335 R
[51] Int. Cl. .............................................. F16k 1/00
[58] Field of Search...137/238, 241, 614.11, 614.18, 137/630.19, 630.22, 637.2; 251/335 R

[56] References Cited
UNITED STATES PATENTS

| | | | |
|---|---|---|---|
| 2,829,670 | 4/1958 | Nix ............................... | 137/637.2 X |
| 3,322,142 | 5/1967 | Baumann ........................ | 251/335 R |
| 3,643,679 | 2/1972 | Hansson......................... | 137/241 X |

*Primary Examiner*—Robert G. Nilson
*Attorney, Agent, or Firm*—Kurt Kelman

[57]  ABSTRACT

A compound aseptic double valve prevents doubly the passage of fluid between two ports spaced from each other. More particularly, the valve is highly aseptic and capable of providing a sealing and it is thus well suited for use in manufacturing and processing machinery or plants where food or beverage products are handled. The valve comprises a first valve member, a second auxiliary valve member mounted on a first valve shaft for actuating the first valve member, a second sleevelike valve shaft mounted on the first valve shaft to actuate the second auxiliary valve member on the first valve shaft, a second driving source provided independently of a driving source for actuating the first valve shaft and adapted to move the second auxiliary valve member and the second valve shaft on the first valve shaft in a direction which closes the valve, a valve seat for each of the first and second valve members to come into contact therewith, the valve seats being located in the same valve housing to provide a double sealing, and a bellows for sealing within the valve housing those portions of the first and second valve shafts which are moved in and out of the valve housing.

5 Claims, 1 Drawing Figure

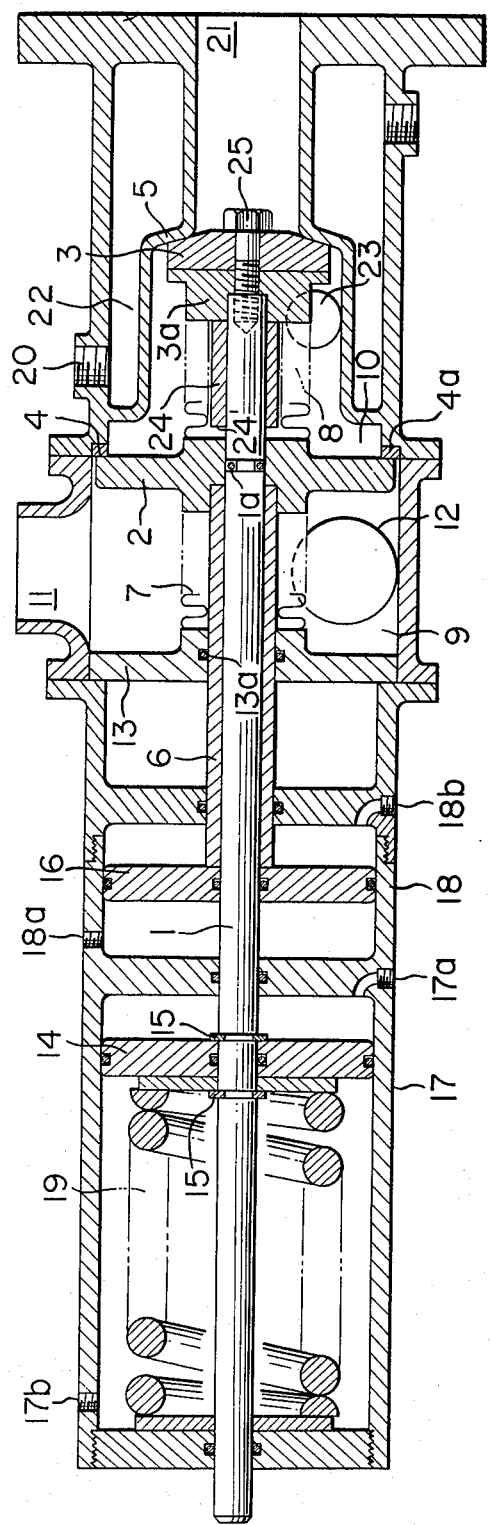

COMPOUND ASEPTIC VALVE

BACKGROUND OF THE INVENTION

The present invention relates to valves for blocking the passage of fluid. More particularly, the present invention relates to a compound aseptic valve which is well suited for use in manufacturing machinery or plants where food products, particularly milk is handled.

In a plant where milk is processed, frequent cleaning of the pipe line system for delivering milk is required. In such cleaning of the pipe line system in place, the pipe line system must be, without exception, sealed completely from the milk storage tank. Otherwise, there is the danger of an undesirable cleaning liquid leaking into and contaminating the food product, i.e. milk, and thus causing a loss when a large quantity of milk must be discarded.

Heretofore, it has been customary to use a single valve at a point of connection between the pipe line system and the storage tank and generally satisfactory results have been obtained with such a single valve. If, however, extraneous substances included in the raw milk in a considerable amount attach themselves to the valve member or the valve seat, or if there is any defect in the valve member or the valve seat, the valve cannot close completely, thus failing to provide a satisfactory seal.

Further, in a plant handling milk, it is preferable that not only the air and the machine oil, etc. should be prevented from entering into the pipe line system, but also the milk in the pipe line system should not be allowed to leak past the valve. Otherwise, there is the danger of pathogenic microorganisms breeding on the leaked milk and eventually penetrating into the system.

Therefore, the valve used in such plants must provide a highly reliable leakproof joint between the outside and the space it closes. In practice, however, such a valve has a valve shaft which is reciprocated in and out of the system to actuate the valve member and it is not an easy matter to hermetically seal that portion of the valve shaft which reciprocates to move in and out of the system.

In the past, a diaphragm type valve, for example, has been used to prevent contamination of the milk in the pipe line system. A disadvantage of the diaphragm type valve is that the diaphragm valve is subjected to a temperature as high as 130°C which is necessary for sterilizing milk and it is also exposed to acid or alkali solution used for cleaning purposes. Therefore, even if a neoprene diaphragm is used, it tends to be destroyed in a week or two.

The present invention thus relates to a compound aseptic valve in which, with a view to solving the problem of inadequate blocking of the pipe line system encountered with the conventional valves, and completely sealing those portions of valve shafts exposed to the outside, those portions of the valve shafts which move in and out of a valve housing are enclosed with a bellows and a second auxiliary valve is actuated on the valve shaft for a first valve independently of the first valve.

SUMMARY OF THE INVENTION

It is an object of the present invention to provide a compound aseptic valve for providing a double sealing which comprises a first valve for providing an ordinary seal, and a second auxiliary valve actuated on the valve shaft for the first valve.

It is another object of the present invention to provide a compound aseptic valve which is actuated by a compound single-shaft air cylinder and which comprises a second sleevelike valve shaft mounted on a first valve shaft and wherein a second auxiliary valve is actuated on the first valve shaft by the second valve shaft.

It is still another object of the present invention to provide a compound aseptic valve wherein a compound single-shaft valve shaft unit is completely enclosed by bellows within the valve housing to completely close the inside of the valve system from the outsides.

It is still another object of the present invention to provide a compound aseptic valve of a coustruction which is simple and well suited for cleaning in place.

Other objects and advantages of the present invention will become readily apparent from considering the following detailed description in conjunction with the accompanying drawings.

BRIEF DESCRIPTION OF THE DRAWING

The single drawing FIGURE is a sectional view showing the double sealing structure and the perfect valve shaft sealing structure of a compound aseptic valve according to a preferred embodiment of the present invention.

DESCRIPTION OF THE PREFERRED EMBODIMENT

In the illustrated preferred embodiment, the present invention is incorporated in a valve system in which a raw material such as milk is delivered from a port 21 connected to a storage tank in a path through valve housing portions 10 and 9 to an exit port 12 connected to a milk supply line system, or alternately milk is supplied from an inlet port 11 into the storage tank through the port 21. On the left side in the illustration, there is shown an air cylinder 17 having a spring 19 mounted therein for actuating a valve shaft 1. A piston 14 is mounted on the valve shaft 1 in the air cylinder 17 and secured on the valve shaft 1 by left and right snap rings 15 so that the piston 14 moves axially with valve shaft 1. The piston 14 is provided with an O-ring placed in a circumferential groove thereof and it is disposed in sliding contact with the wall of the air cylinder 17.

An air cylinder 18 housing a piston 16 is arranged to the right of the air cylinder 17. The piston 16 is also mounted on the valve shaft 1 and it is provided with an O-ring in a circumferential groove thereof and also between it and the valve shaft 1 on which it is slidably mounted.

A sleeve 24 is mounted on the valve shaft 1 at one end portion thereof, and the left end face of the sleeve 24 forms an abutment 24' on the valve shaft 1. A bellows guide 3a is mounted on the valve shaft 1 at the end thereof and a first valve member 3 is placed at one end of the bellows guide 3a and the valve member 3 is fixedly connected with the valve shaft 1 by a locking bolt 25.

A second valve member 2 is mounted on the valve shaft 1 to the left of the abutment 24' with some clearance therebetween. The valve shaft 1 is provided with an O-ring in a circumferential groove 1a at that portion thereof where the second valve member 2 is mounted, and the second valve member 2 is axially slidable on the valve shaft 1.

Sleeve 6 is slidably mounted on valve shaft 1 and operatively associates the second valve member 2 and the piston 16 with each other for common axial movement in respect of valve shaft 1. A valve housing cover plate 13 is provided with a bore through which the valve shaft 1 and sleeve 6 extend, and the cover plate 13 is also provided with an O-ring placed in an inner wall groove 13a formed in its bore so that the valve shaft 1 and the sleeve 6 are slidably movable in this bore. One end of a bellows 7 is secured by welding, for example, to the cover plate 13 and the other end of the bellows 7 is also secured by welding, for example, to the surface of the second valve member 2. The bellows 7 thus encloses and seals that portion of the sleeve 6 which is moved in and out of the valve housing through the cover plate 13. While the O-ring 13a is provided in the bore of the cover plate 13, infiltration of any contaminated substance into valve housing portion 9 through the O-ring 13a is completely prevented by the bellows 7.

A bellows 8 is connected by welding, for example, to the valve member 2 and the bellows guide 3a at both ends thereof. The bellows 8 completely prevents any contaminated substance adhered to the surface of the valve shaft 1 exposed to the outside from entering into valve housing portion 10 through the small opening between the surface of the valve shaft 1 and the inner surface of the sleeve 6 or the contamination substance produced by the air admitted into the bellows 7 from entering into the valve body portion 10 through the small opening between the valve member 2 and the valve shaft 1. The sleeves 6 and 24 respectively serve as a bellows guide face in the inside of the bellows 7 and 8, respectively, to prevent vibration of the bellows 7 and 8 due to changes in the pressure of fluid or pulsation of the fluid. The sleeves 6 and 24 also respectively occupy the inner space of bellows 7 and 8 so that, if any fluid enters by any chance into the bellows 7 and 8, the fluid quickly flows out through the respective air bleeding holes (not shown) and thus the trouble may be readily detected.

The valve housing comprises two portions, i.e., the first valve housing portion 10 and the second valve housing portion 9. The first valve housing portion 10 is provided with a stepped portion at its left end edge and a packing 4a made of Teflon, for example, is placed on the stepped portion. The packing 4a also provides a second valve seat 4 which comes into or out of engagement with the valve member 2. That portion of the second valve member 2 which engages the valve seat 4 may be formed flat as shown in the drawing or it may be formed with a ring-shaped projecting edge.

The operation of the illustrated device is as follows. The cylinders 17 and 18 are respectively provided with normally open through holes 17a and 18a. When it is desired to open the first and second valves so that fluid is supplied from the inlet port 11 into the tank through the port 21 or the fluid is directed to the exit port 12 through the port 21, compressed air is supplied into the air cylinder 17 through its through hole 17a. This causes the piston 14 to move to the left against the force of the spring 19 and consequently the valve shaft 1 also moves along with the piston 14 by virtue of the snap rings 15. The valve member 3 fixedly connected with the valve shaft 1 by the bolt 25 separates its face from the first valve seat 5 to open the first valve. About that time, the compressed air previously supplied into the cylinder 18 through hole 18b is exhausted through the hole 18a. As the valve shaft 1 is moved to the left, the left end 24' of the sleeve 24 abuttingly engages the right side of the second valve member 2 so that the second valve is opened slightly later than the opening of the first valve. Thereafter, the valve shaft 1 is moved a predetermined distance along with the second valve member 2. When the two valves are opened in this manner, the fluid supplied from the tank, for example, flows into the first valve housing portion 10 through the port 21 and this fluid thus flows into the exit port 12 connected to the supply pipe line through the valve housing around the periphery of the second valve member 2 which has already moved to provide a sufficient cross-sectional area for the passage of the fluid. In this way, the opening of the first and second valves is accomplished by the same driving source. With the opening of the first and second valves, the air in the bellows 7 is exhausted through a hole formed in the cover plate 13 which is not shown, and the air in the bellows 8 is exhausted through the previously mentioned air bleeding hole.

On the other hand, when the two valves are to be closed, the air is exhausted from the air cylinder 17 through the hole 17a to permit spring 19 to expand. This causes the piston 14 to move to the right so that the valve shaft 1 is moved to the right and consequently the face of the valve member 3 attached to the end of the valve shaft 1 comes into contact with the first valve seat 5 and closes the first valve. Along with the exhaustion of the air through the hole 17a, compressed air is supplied into the cylinder 18 through the hole 18a to move the piston 16 to the right. Consequently, the piston 16 moves the sleeve 6 to the right as it slides on the valve shaft 1, so that the second valve member 2 fitted on the sleeve 6 is pressed and closes the second valve. Thus, since the opening and closing of the two valves are effected by supplying and exhausting air alternately through the holes 17a and 18a, only a single compressed air supply pipe line is required and a centralized control can thus be applied easily.

It will thus be seen from the foregoing description that in the valve according to the present invention, each of the first and second valves is actuated by its own driving source and therefore even when foreign matter is by any chance interposed between the second valve seat 4 and the valve member 2 causing the latter to lift, the valve shaft 1 is not caused to lift along with the second valve member 2 and thus the first valve remains in the closed position. Further, since there is some clearance between the second valve member 2 and the sleeve 24, when foreign matter enters between the first valve seat 5 and the valve member 3 causing the valve shaft 1 to lift, the second valve still remains closed.

In cleaning the pipe line system upon completion of the operation, the first and second valves are closed to provide a space with both the inlet and outlet sides for fluid being sealed. Thereafter, the fluid within the system is exhausted through the exit port 12. Then, a cleaning liquid is supplied into the exit port 12 from the port 11 to clean the pipes outside the tank. Since a double sealing is provided on the storage tank side, even if there is a fault in one of the valves causing it to close incompletely, the cleaning liquid is prevented from leaking into the storage tank. Further, since the first valve housing portion 10 is not cleaned during the above-mentioned cleaning of the pipe lines, in order for example to prevent the turning of milk due to rise in the temperature thereof, a coolant may be continuously supplied from an opening 20 into a sleeve 22 in the same manner as the cooling of the tank to thereby cool and preserve the milk. The cleaning of the valve housing portion 10 is effected simultaneously with the cleaning of the tank.

Furthermore, a valve 23 exclusively used for draining purposes may be provided between the first valve sealing system (3, 5) and the second valve sealing system (2, 4) so that this drain valve may be suitably opened to examine the remaining fluid therein. In this case, if there is any cleaning liquid present in the fluid, it indicates that there is leakage at the second valve sealing system, whereas if the presence of milk or the like is detected after the fluid between the first and second valve sealing systems has been discharged, it indicates that there is leakage at the first valve sealing system.

It will thus be seen from the foregoing description that the present invention provides a double sealing valve assembly wherein the closing of two valves is effected by means of separate driving sources, while the opening of the two valves is effected by the same driving source. In this way, not only when there is any foreign matter in one of the valves, but also when there is a fault in one of the valves, the passage of fluid can nevertheless be prevented safely and positively.

We claim:
1. A compound aseptic valve comprising:
   a. a valve housing having two ports spaced from each other and defining a valve chamber between the ports;
   b. a first valve seat and a second valve seat spaced from each other in the valve chamber between the ports;
   c. an elongated valve shaft mounted in the valve housing and extending into the valve chamber;
   d. a sleeve slidably mounted on the valve shaft;
   e. first actuating means for axially moving the valve shaft;
   f. second actuating means for axially moving the sleeve on the shaft;
   g. first and second valve members mounted on the valve shaft,
      1. the first valve member being arranged sealingly to engage the first valve seat in response to movement of the valve shaft in one direction by the first actuating means and thereby blocking a path in the valve chamber between the ports, and to be disengaged from the first valve seat in response to movement of the valve shaft in a direction opposite to the one direction by the first actuating means, and thereby opening the path between the ports, and
      2. the second valve member being arranged sealingly to engage the second valve seat in response to movement of the sleeve in one direction by the second actuating means and thereby blocking the path between said ports, and to be disengaged from the second valve seat in response to the movement of the valve shaft in the direction opposite to the one direction by the first actuating means; and
   h. first and second bellows respectively enclosing a portion of the assembly of the shaft and the sleeve,
      1. the first bellows being interposed between the first and second valve members in the axial direction of the shaft, and
      2. the second bellows being interposed between the valve housing and the second valve member in the axial direction of the shaft and sleeve assembly.

2. A valve as set forth in claim 1, further comprising a guide sleeve secured to said first valve member for movement therewith, said guide sleeve being enclosed in said first bellows and having a guide face extending in the direction of elongation of said shaft and backing said first bellows.

3. A valve as set forth in claim 1, wherein said first actuating means comprises an air cylinder whereby said force for moving said shaft in said one direction is provided by a spring and said force for moving said shaft in said opposite direction is provided by compressed air, and wherein said second actuating means comprises an air cylinder whereby said force for moving said sleeve in said one direction is provided by compressed air.

4. A valve as set forth in claim 1, further comprising an abutment on the valve shaft, and wherein the second valve member is mounted adjacent the abutment for motion transmitting engagement by the abutment when the shaft moves in the direction opposite to the one direction, the abutment transmitting motion to the second valve member in association with the second actuating means.

5. A valve as set forth in claim 4, wherein the distance between the second valve member and the abutment is greater than the diameter of foreign matter which may normally enter between the first valve member and the first valve seat in the sealingly engaging portions thereof when the first and second valve members respectively engage the first and second valve seats.

* * * * *